No. 712,343. Patented Oct. 28, 1902.
C. G. SUDRE & C. V. THIERRY.
APPARATUS FOR THE TREATMENT OF DISTILLERS' SPENT RESIDUES.
(Application filed Feb. 18, 1901.)
(No Model.) 6 Sheets—Sheet 1.
FIG. I.
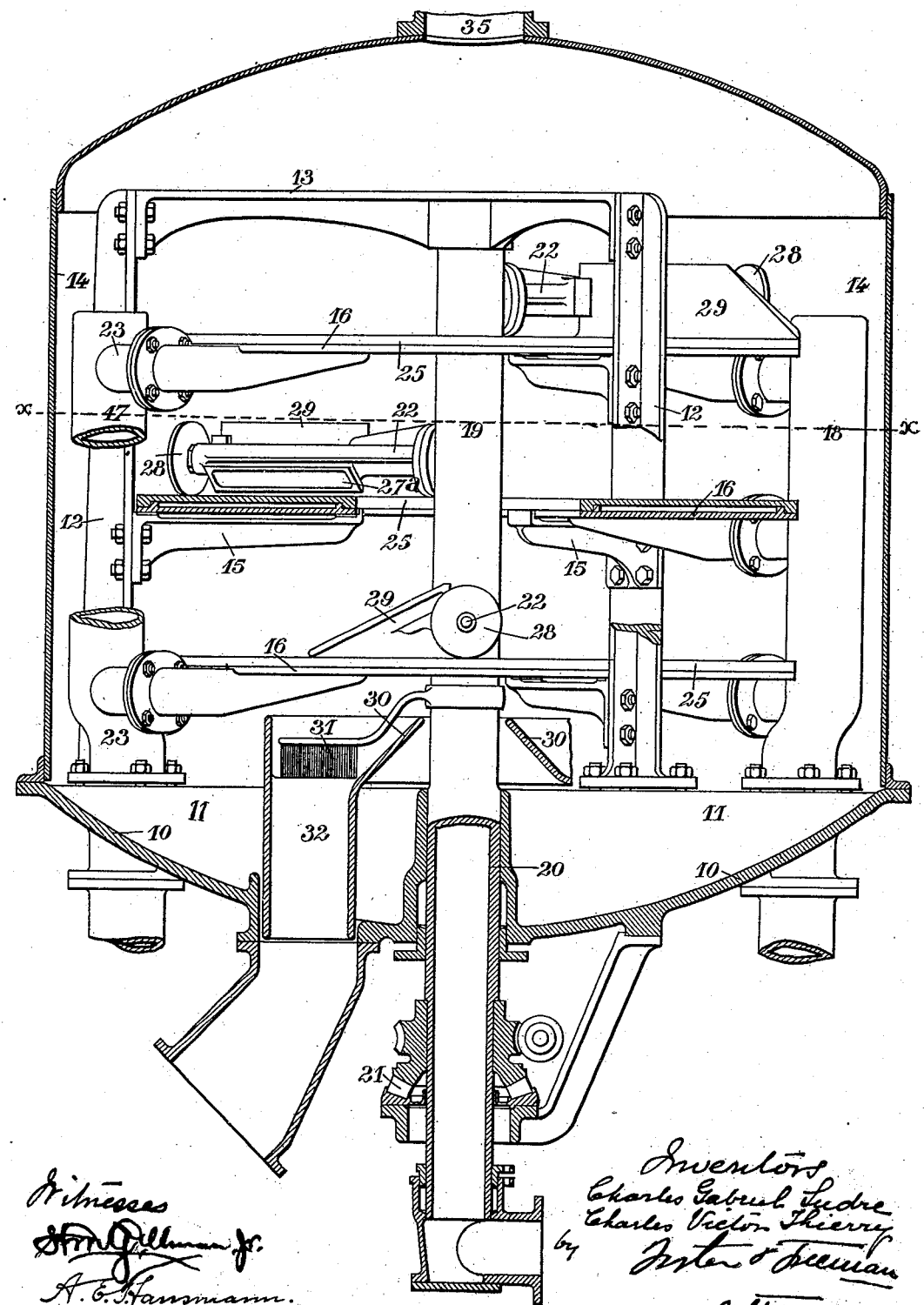

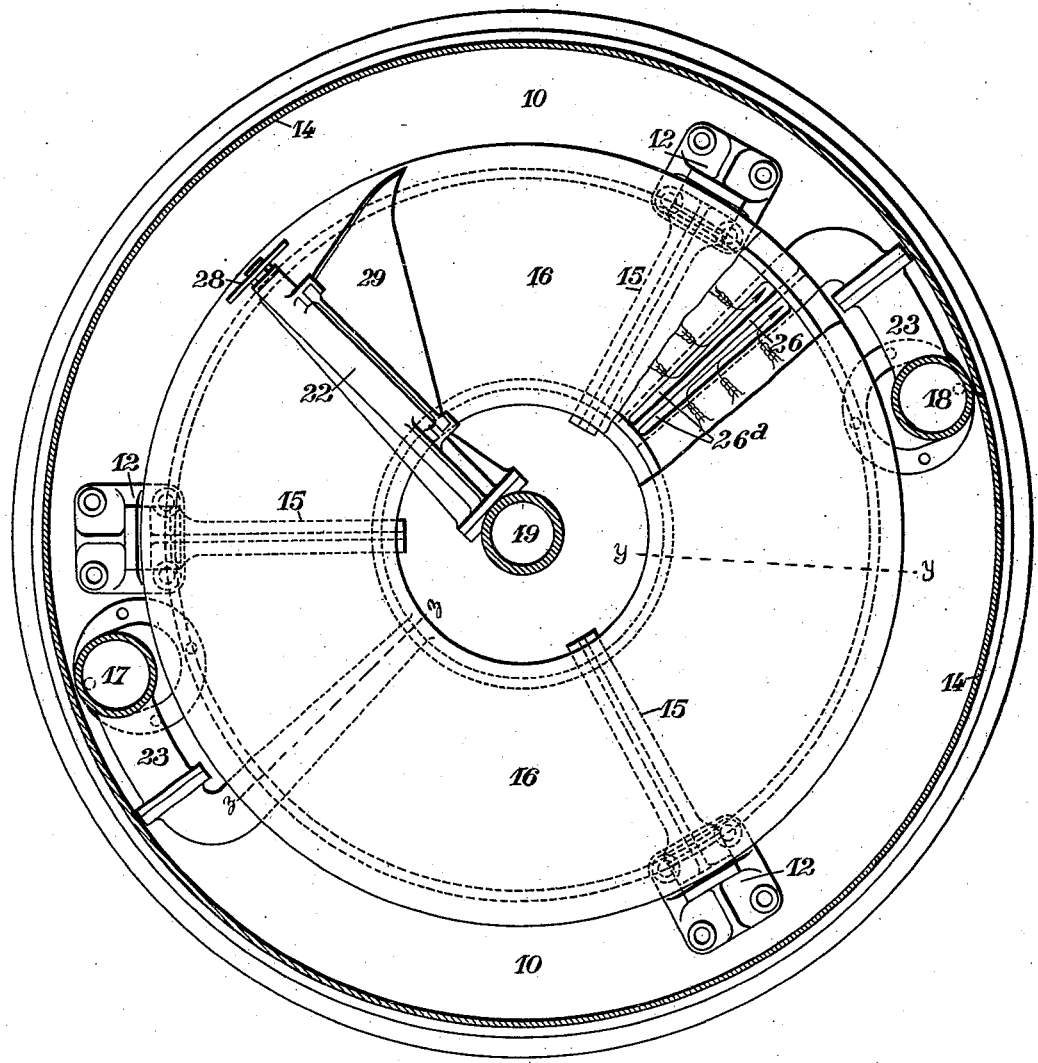

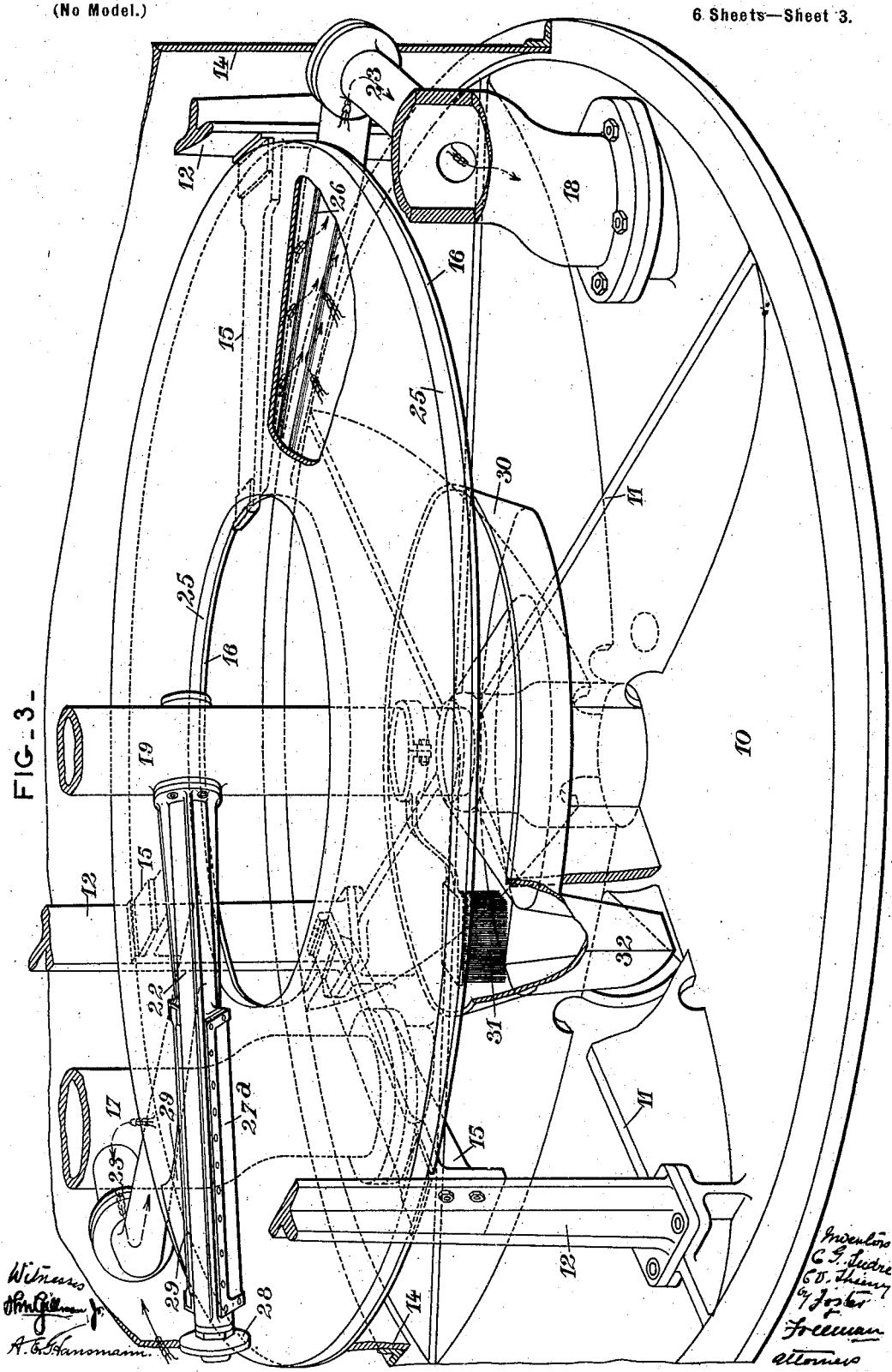

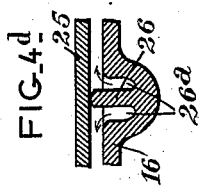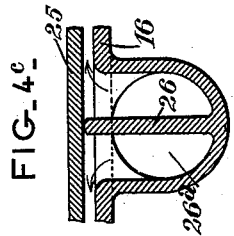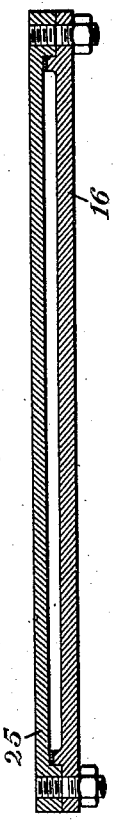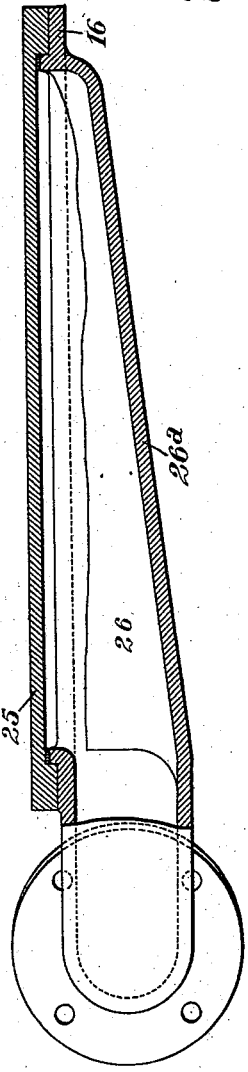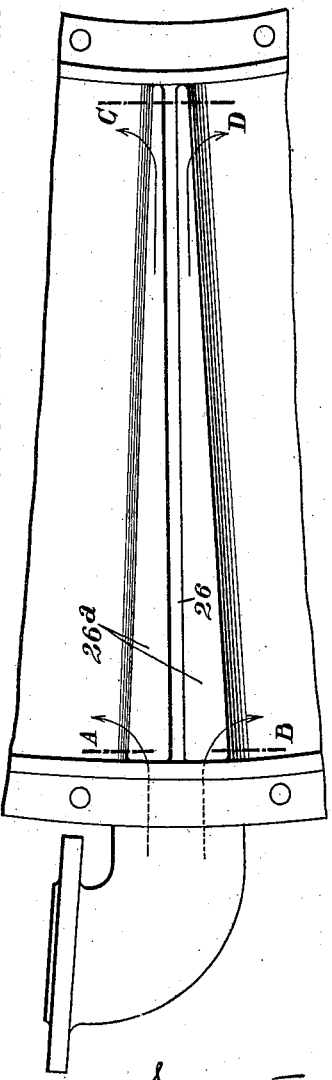

No. 712,343. Patented Oct. 28, 1902.
C. G. SUDRE & C. V. THIERRY.
APPARATUS FOR THE TREATMENT OF DISTILLERS' SPENT RESIDUES.
(Application filed Feb. 18, 1901.)
(No Model.) 6 Sheets—Sheet 5.
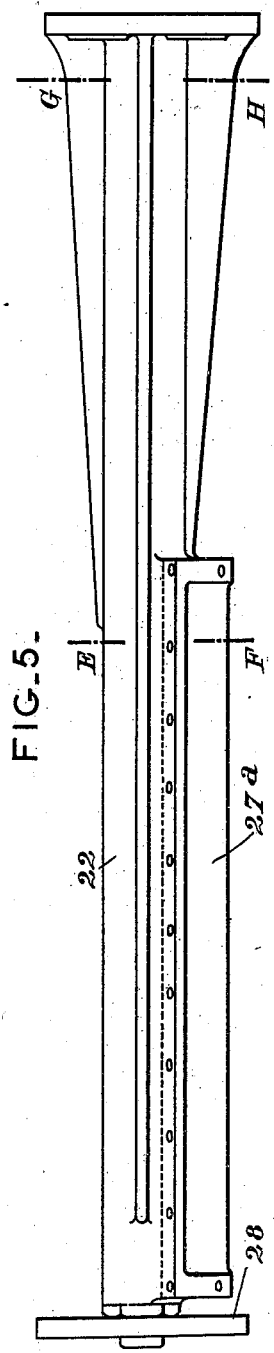
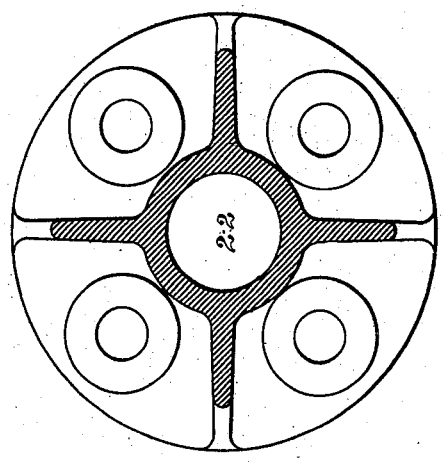
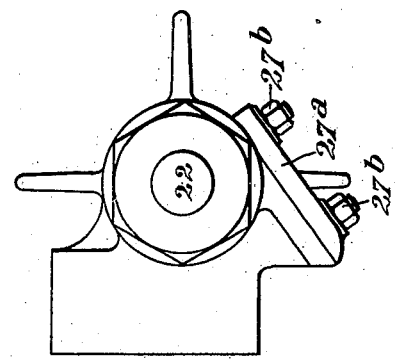
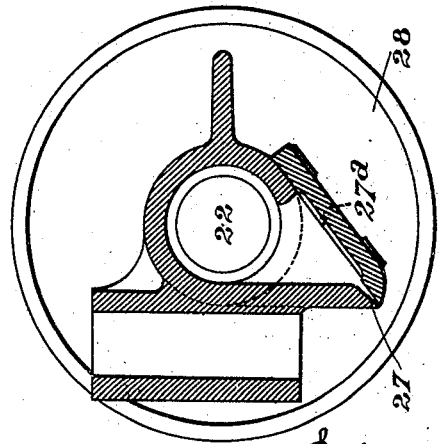

No. 712,343. Patented Oct. 28, 1902.
C. G. SUDRE & C. V. THIERRY.
APPARATUS FOR THE TREATMENT OF DISTILLERS' SPENT RESIDUES.
(Application filed Feb. 18, 1901.)
(No Model.) 6 Sheets—Sheet 6.
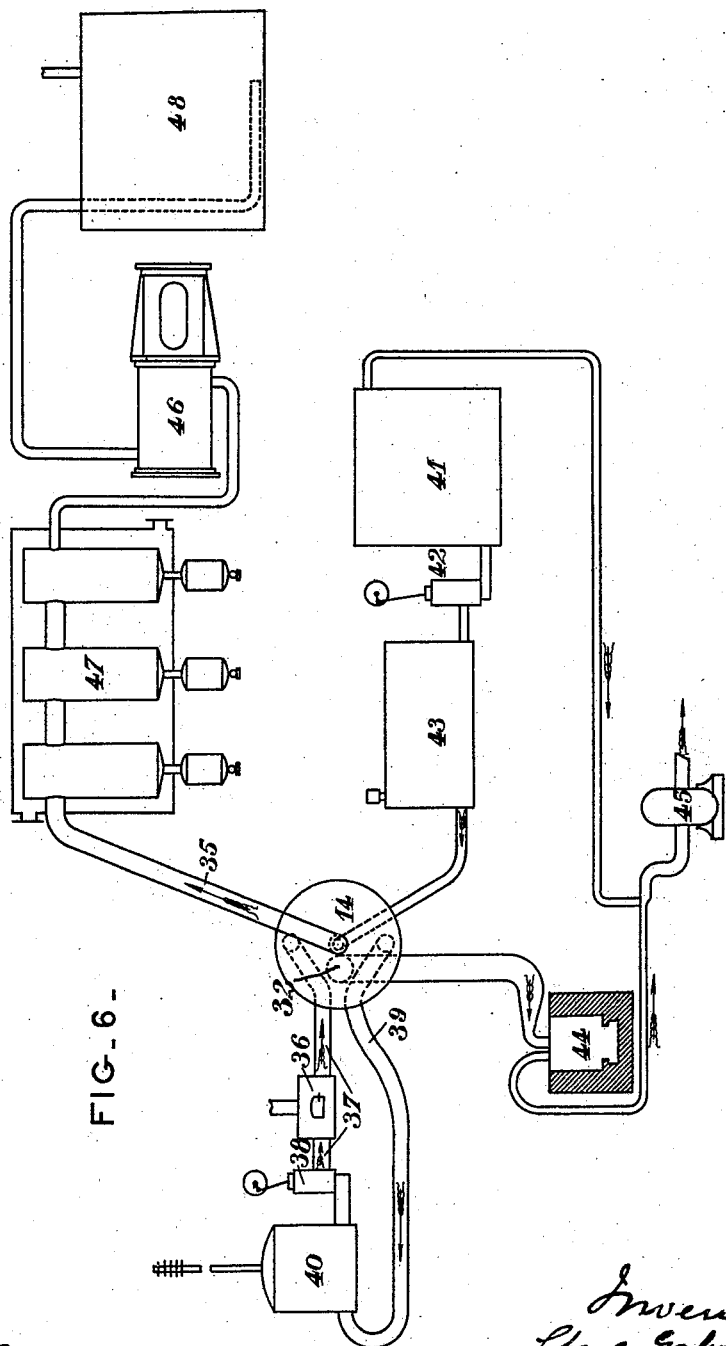

United States Patent Office.

CHARLES GABRIEL SUDRE AND CHARLES VICTOR THIERRY, OF PARIS, FRANCE.

APPARATUS FOR THE TREATMENT OF DISTILLERS' SPENT RESIDUES.

SPECIFICATION forming part of Letters Patent No. 712,343, dated October 28, 1902.

Application filed February 18, 1901. Serial No. 47,840. (No model.)

*To all whom it may concern:*

Be it known that we, CHARLES GABRIEL SUDRE and CHARLES VICTOR THIERRY, citizens of the French Republic, residing at Paris, France, have invented a certain new and useful Improved Apparatus for the Treatment of Distillers' Spent Residues or Wash, of which the following is a specification.

Our invention relates to an improvement upon an apparatus previously designed by us and described in application, Serial No. 28,435, filed August 29, 1900, for the treatment of distillers' spent residues or wash for the purpose of extracting therefrom as by-products the nitrogenous matters, (as ammoniacal compounds,) glycerin, tars, and salts, in which apparatus the concentrated wash was allowed to flow in the form of a continuous sheet or layer out of a pipe or the like of suitable section onto a moving endless supporting-surface which conveyed it through a closed chamber or chambers heated to a suitable temperature and from which air was exhausted.

It will be understood that in the arrangement described the discharging-pipe was fixed and the supporting-surface movable. According to our present invention we prefer to reverse this operation and to give the discharging-pipe a traveling movement over a fixed supporting-surface in some suitable manner.

Among the possible modifications whereby our process can be carried out we have previously proposed in the above-referred-to application one consisting in causing circular platforms to revolve under stationary radial pipes arranged around a central rotary axis. By reversing this method of arrangement—that is to say, by distributing the wash upon stationary circular platforms through a central continuously-rotating hollow pipe carrying distributing-arms—an apparatus is obtained to which we give the preference at present as the best known form of construction, and which we shall now describe with reference to the accompanying drawings.

In the drawings, Figure 1 is an elevation of the apparatus, partly in section. Fig. 2 is a central plan on line $x\,x$, Fig. 1, with part of the heating-table removed. Fig. 3 represents the lower portion of the apparatus, on an enlarged scale, in perspective and with certain parts removed. Fig. 4 is a section, on an enlarged scale, of the heating-platform, taken on line $y\,y$, Fig. 2. Fig. $4^a$ is a section of the same, taken through the pipe conveying the heating medium, on line $z\,z$, Fig. 2. Fig. $4^b$ is a plan of Fig. $4^a$ with the top plate removed. Fig. $4^c$ is a section of Fig. $4^b$ on line A B of Fig. $4^b$ with the top plate in position. Fig. $4^d$ is a section of Fig. $4^b$ on line C D of Fig. $4^b$, also with the top plate in position. Fig. 5 is an elevation, on an enlarged scale, of the wash-distributing pipe. Fig. $5^a$ is a section, on a more enlarged scale, on line E F, Fig. 5. Fig. $5^b$ is an end elevation of Fig. 5, on an enlarged scale, with a roller removed. Fig. $5^c$ is a section, on an enlarged scale, on line G H of Fig. 5; and Fig. 6 is a diagrammatic view of a complete installation for the treatment of residues by our process.

The chamber employed has a concave bottom 10, Fig. 1, provided with suitable radial ribs 11, as shown in perspective in Fig. 3, on which ribs is mounted a framework consisting of three uprights 12, connected at the top by a triple cross-piece 13, the whole being surrounded by a sheet or light iron wall and cover 14, forming a bell, which can be lifted off and replaced by the aid of a crane or any other hoisting-gear. The uprights 12 carry brackets 15, supporting the hollow circular platforms 16, in which circulates the heating liquid and upon which are distributed the layers of wash under treatment. The hollow spaces in the interior of the platforms 16 communicate by pipes 23 with a feed-pipe 17 for supplying the heating liquid and with an outlet-pipe 18 for discharging this liquid. In the center of the apparatus is a hollow vertical shaft 19, passing through a stuffing-box 20 and supported underneath by a roller-bearing 21, the upper end being carried by the cross-piece 13. This shaft conveys the concentrated wash into the apparatus and distributes it over the platforms 16 by the aid of the radial distributing-arms 22. When all these parts are in working order, the whole is covered by the bell 14, which is then bolted onto the base-plate. In the event of a stoppage or an accident or if it is desired to examine the interior the shell is unbolted and taken off.

The heating liquid (preferably petroleum of a kind that does not give off vapor except at a very high temperature) is supplied to the platforms through the ascending pipe 17 and connections 23, which are capable of expansion under heat. The outlet-pipe 18 is placed at a point diametrically opposite to 17 and is constructed and attached to the platforms in the same manner as the supply-pipe.

The platforms 16 are formed of a circular plate of cast-iron of trough-like section, closed by a flat plate 25, bolted thereto, as shown in Fig. 4, so that a space is left between the two.

A vertical radial partition 26, Figs. $4^a$, $4^b$, $4^c$, $4^d$, cast in one piece with the plate 16, which is formed with a tapering channel $26^a$ at this point, divides the current of heating liquid into two parts, which pass to the right and left, respectively, and after traveling halfway around the apparatus unite at a point diametrically opposite and are run off through the outlet-pipe 18.

The wash after being passed through sieves for the purpose of eliminating any impurities capable of obstructing the pipes is led into the apparatus by way of the hollow shaft 19, which carries the distributing-arms 22, one to each platform, each of them being in the form of a pipe having a slit 27, Figs. $5^a$, $5^b$, the aperture of which becomes widest toward the outer end of the arm than it is at the inner end or center of the apparatus, so as to distribute the layer of wash uniform in thickness all over the surface of the platform. The orifice or slit 27 may be adjusted in size by the plate $27^a$, which is movable and adjustable in position by the bolts $27^b$. The arms 22 travel over the platforms by means of rollers 28 at the outer ends of same, and each arm carries in front of it a knife or scraper 29 of a suitable form, Fig. 2, for scraping the platforms in front of the delivery-slit and pushing the scrapings into the vacant space inside the platforms, where the material falls into a circular trough 30, a brush 31, mounted on the shaft 19, sweeping the material into the pipe 32, whence it is discharged from the apparatus. The gas and vapors are drawn off by a vacuum-pump through a pipe 35, situated at the top of the bell 14.

The operation is as follows: The heating-petroleum traverses a closed cycle—that is to say, the same petroleum is passed through the apparatus again and again for an indefinite period for the purpose of giving up to the wash on the platform the heat it has abstracted each time from any suitable source of heat. The petroleum heated in the furnace 36, Fig. 6, travels by way of pipe 37 into the upcast pipe of the apparatus, being forced by the circulating-pump 38, which is placed in the circuit of its travel. The oil is delivered by the distributing-pipes into the interior of each platform and is divided into two currents by the separating-partition 26. It then passes around the platform and after leaving the platform is conveyed into the main discharge-pipe, which is connected with a pipe 39 for conveying the petroleum back to the furnace. The cycle is thus complete. An expansion-chamber 40 of any suitable type can be placed in the circuit. The wash, concentrated to a strength of about 35° Baumé, is neutralized with lime in a mixer 41 and is raised by a pump 42 into a vat 43, whence after passing through the sieves or the like it is delivered under suitable pressure into the shaft 19. This shaft is rotated at a convenient speed for effecting the uniform distribution of the wash on the platforms as a regular layer of the desired thickness. The velocity of rotation is such that the time occupied in completing one entire revolution of the distributing-pipe corresponds exactly with that required for depriving the layer of wash of the whole of its contained water and glycerin, these being drawn off in the form of vapor by an exhaust-pump, which produces a vacuum within the apparatus. In its rotary movement each distributing-arm is preceded by a scraper, which clears the platform of the evaporated wash which was spread thereon during the preceding revolution, and which scraper by reason of its form turns the treated material over into the empty interior space, whence it falls into the collecting-trough and is swept by the brush into the discharge-pipe. The wash, freed from contained water and glycerin, is conveyed to a continuous calcination-furnace 44, and the tarry and ammoniacal matters are drawn off by a fan 45 and delivered to separating, purifying, and other apparatus. (Not shown in the drawings.) This same fan also draws off the ammoniacal vapors disengaged in the mixer 41. In order to facilitate the liberation of the glycerin while the wash is spread out on the platforms, it is advisable to inject a little superheated steam into the apparatus above each platform, which steam keeps the molecules of glycerin in suspension and acts as a vehicle carrying the molecules away in the current set up by the vacuum-pump. Nevertheless, as there is always the risk of a slight condensation in spite of this precaution the bottom of the apparatus, where any of the condensed glycerin liquors might accumulate, may be provided with a well or flask, from which they can be easily removed.

The water-vapor, carrying with it the glycerin ammoniacal and certain light tarry matters liberated during the evaporation process, leaves the apparatus by way of the pipe 35, communicating with the vacuum-pump 46, the vapor passing first into a condenser 47, where the glycerin liquors are recovered, after which the vapor is forced into one or more sulfuric-acid tanks 48, in which the sulfate of ammonia is recovered. The tars are separated, washed, and treated in ordinary forms of apparatus. (Not shown here.)

For the purpose of avoiding any possible obstruction in the various pipes they are preferably fitted with plugs wherever necessary. Both the platforms and the bottom circular trough are carried on the framework at certain points only, and layers of asbestos are interposed between the parts in order to prevent loss of heat by conduction, which also prevents the stuffing-box on the shaft from getting hot. The apparatus is also fitted with the necessary appliances for measuring temperatures and pressure.

What we claim is—

1. In an apparatus for the treatment of distillers' spent residue or wash, the combination of the platform, a hollow vertical shaft centrally arranged with respect thereto an arm provided with a longitudinal delivery-slit, means for adjusting the width of the same, and a scraper carried by said arm, means for conveying wash to the central shaft and means for rotating said shaft, substantially as described.

2. In an apparatus for the treatment of distillers' spent residue or wash, the combination of a heated platform, a hollow vertical shaft centrally arranged with respect thereto, a hollow radial arm connected to the shaft and provided with a longitudinal delivery-slit, a trough surrounding the shaft beneath the platform and a scraper carried by the arm arranged to scrape the platform in advance of the slit and push the scrapings inwardly toward the shaft and into the trough, a delivery-pipe and a brush for sweeping the scrapings into the same, means for conveying wash to the central shaft and means for rotating said shaft, substantially as described.

3. In an apparatus for the treatment of distillers' spent residue or wash, the combination of a hollow circular platform, means for conveying a heating medium to a point at one side of said platform, means at a diametrically opposite point on the other side of the platform for conveying the heating medium from the platform, and means for circulating the said heating medium in the hollow platform in two oppositely-directed streams from the point of entrance, substantially as described.

4. In an apparatus for the treatment of distillers' spent residue or wash, the combination of a hollow platform formed by a circular plate 16, of trough-like section, covered by another plate leaving a space between the two, said plate 16 having a radial channel $26^a$, provided with a radial partition 26 therein, means for conveying a heating medium to said channel $26^a$, and circulating it within the hollow platform, and means for conveying said heating medium from said platform, substantially as described.

5. In an apparatus for the treatment of distillers' spent residue or wash, the combination of a hollow platform formed by a circular plate 16, of trough-like section covered by another plate, leaving a space between the two, said plate 16, having radial channels $26^a$, provided with radial partitions 26 therein, means for conveying a heating medium to one of said channels and circulating it within the space between the plates and means for conveying the heating medium from the other channel, substantially as described.

In testimony whereof we have signed our names to this specification in the presence of two subscribing witnesses.

CHARLES GABRIEL SUDRE.
CHARLES VICTOR THIERRY.

Witnesses:
JORDAN DAVID STENNER,
EDWARD P. MACLEAN.